W. E. McCOY & S. D. SPRONG.
MEANS FOR ELECTRICALLY DETERMINING TRANSMITTED POWER.
APPLICATION FILED APR. 1, 1912.

1,111,848.

Patented Sept. 29, 1914.

UNITED STATES PATENT OFFICE.

WALTER E. McCOY AND SEVERN D. SPRONG, OF NEW YORK, N. Y., ASSIGNORS OF ONE-THIRD TO FRANK W. SMITH, OF NEW YORK, N. Y.

MEANS FOR ELECTRICALLY DETERMINING TRANSMITTED POWER.

1,111,848.

Specification of Letters Patent.  Patented Sept. 29, 1914.

Application filed April 1, 1912.  Serial No. 687,896.

*To all whom it may concern:*

Be it known that we, WALTER E. McCOY and SEVERN D. SPRONG, citizens of the United States, residing at New York, in the county of New York and State of New York, have invented a certain new and useful Improvement in Means for Electrically Determining Transmitted Power, of which the following is a specification.

Our invention is a means for electrically determining the power transmitted by a shaft or its equivalent either momentarily or in a given time.

Figure 1:
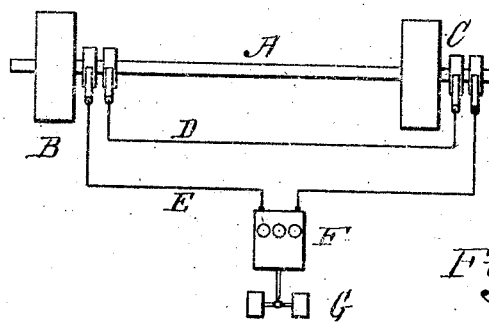
Figure 2:
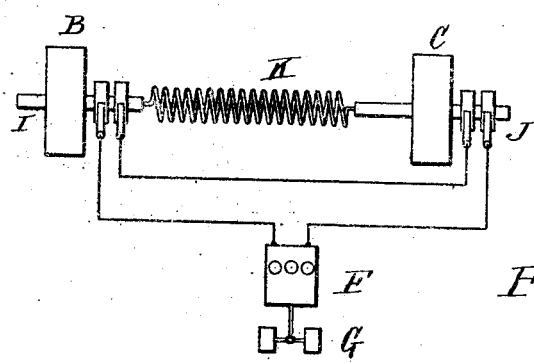
Figure 3:
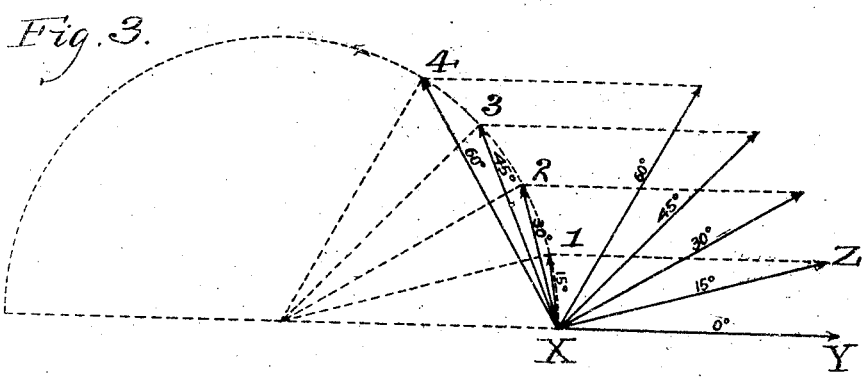

In the accompanying drawings—Figure 1 diagrammatically illustrates our device applied to a power transmitting shaft. Fig. 2, in like manner, illustrates our device applied to a power transmitting helical spring. Fig. 3 shows graphically the operation of the device to produce the voltage which controls the meter.

Similar letters of reference indicate like parts.

Referring first to Fig. 1, A is the power transmitting shaft. B and C are two alternating current generators mounted thereon. Said generators will preferably have permanent or constantly excited magnets, so that for any change in speed a voltage in direct ratio thereto will be developed; and they are secured to the shaft in such relation as that when there is no torsion of the shaft, their voltage curves will be zero degrees apart and in phase with one another; or, in other words, the generator B will have a wave of equal voltage coincident in time with that of generator C. The generator terminals of like polarity are connected by the wires D, E, so that, normally, no current will flow when the voltages are parallel, equal in amount and in opposite direction. In the circuit is inserted a motor meter F, in which, in order to obtain a small current, it is desirable that both the stationary and revolving elements be wound of fine wire and connected in series.

Assume the driving power to be applied to one end of shaft A and to be transmitted through said shaft to the load, the generators then being located between power and load. There will then be a torsional deflection of the shaft, so that the generator nearer the load, as, for example, B, will lag behind the other generator C. This lag will cause a divergence from parallelism of the voltage waves of the two generators, and a current will accordingly flow in the windings, circuit wires and meter. The voltage of this current is graphically illustrated in Fig. 3. Here, the line X Y may be taken as representing the coincident voltages of the generators B, C, when the shaft A is without torsional deflection. Assume the load to cause a lagging of generator B, so that the voltage line X Z of B will diverge 15 degrees from the voltage line X Y of C: then the voltage at the meter will be represented by the line X 1, which is obviously the diagonal in the parallelogram of forces. Similarly, if the voltage line of B diverge 30, 45 or 60 degrees, as shown in Fig. 3, the voltage applied at the meter terminals will be represented by the diagonals X 2, X 3, X 4. While in practice the actual mechanical deflection of shaft A may be small, the extent of said deflection is, nevertheless, a very accurate indication of the power transmitted by said shaft. This can readily be determined electrically by suitable measuring instruments, and may be integrated and read off in horse-power hours from the motor meter F properly calibrated in such units.

It will be apparent that with a doubled speed of shaft rotation and the same torsional deflection, twice the work will be done; whereas the length of the diagonal, as X 1, X 2, etc., and hence the voltage applied at the meter terminals will be multiplied by two. In order to cause the meter to read directly as the work is done, we apply to its moving member an air vane drag G, which has a retardation effect proportional to the square of the speed.

In the form shown in Fig. 2, the generators B, C are mounted on separate shafts I, J, disposed in line and connected by the helical spring K. The operation is the same as in the case of Fig. 1, the torsional deflection of the spring here taking the place of that of the shaft.

Our device is especially suited to integrating the horse-power hours expended in a given time in driving a steam vessel, the generators B, C then being mounted on the propeller shaft.

We claim:

1. Means for electrically determining power transmitted during a given time, comprising two generators, a rotating power transmitting member capable of deflection under torsional stress connected to the armature shafts of said generators, the said generators being interposed between the driving motor and the load and constructed and connected by a circuit so that their voltage waves will be parallel under zero deflection of said transmitting member, and means in said circuit for determining the voltage resulting from divergence of said waves due to the torsional deflection of said member.

2. Means for electrically measuring and integrating, under given speed and stress of load, power transmitted during a given time, comprising two generators, a rotating power transmitting member capable of deflection under torsional stress connected to the armature shafts of said generators, the said generators being interposed between the driving motor and the load and constructed and connected by a circuit so that their voltage waves will be parallel under zero deflection of said transmitting member, and means in said circuit for measuring and integrating the voltage resulting from divergence of said waves due to the torsional deflection of said member under given speed and stress of load.

3. Means for electrically measuring and integrating power transmitted during a given time, comprising a rotating power transmitting shaft, two generators mounted thereon between the driving motor and the load and having terminals of like polarity connected in circuit, and an integrating electric meter interposed in said circuit.

4. Means for electrically measuring and integrating power transmitted during a given time, comprising a rotating power transmitting shaft, two generators mounted thereon between the driving motor and the load and having terminals of like polarity connected in circuit, an integrating electric meter interposed in said circuit, and means for retarding the rotation of the moving member in said meter proportionately to the square of its speed.

In testimony whereof we have affixed our signatures in presence of two witnesses.

WALTER E. McCOY.
SEVERN D. SPRONG.

Witnesses:
 GERTRUDE T. PORTER,
 MAY T. McGARRY.